United States Patent [19]
Ekemark et al.

[11] Patent Number: 5,740,166
[45] Date of Patent: Apr. 14, 1998

[54] UNITED ACCESS CHANNEL FOR USE IN A MOBILE COMMUNICATIONS SYSTEM

[75] Inventors: Sven Harald Ekemark, Storvreta; Johan Karoly Peter Galyas, Täby, both of Sweden

[73] Assignee: Telefonaktiebolaget LM Ericsson, Stockholm, Sweden

[21] Appl. No.: 617,406

[22] Filed: Mar. 18, 1996

[51] Int. Cl.$^6$ ..................................................... H04B 7/26
[52] U.S. Cl. .......................... 370/331; 370/337; 370/350; 455/440
[58] Field of Search .................................. 370/321, 322, 370/336, 337, 347, 348, 350, 331, 503, 508, 329, 330, 375; 455/33.1, 33.2, 33.4, 132, 133, 136, 137, 436, 438, 440, 443, 450; 379/59, 60; 375/347

[56] References Cited

U.S. PATENT DOCUMENTS

| | | | |
|---|---|---|---|
| 5,483,537 | 1/1996 | Dupuy | 370/350 |
| 5,509,014 | 4/1996 | Utting | 370/337 |
| 5,544,171 | 8/1996 | Godecker | 370/337 |
| 5,615,215 | 3/1997 | Utting et al. | 370/337 |

FOREIGN PATENT DOCUMENTS

| | | |
|---|---|---|
| 0 564 429 | 10/1993 | European Pat. Off. . |
| 0 614 290 A1 | 9/1994 | European Pat. Off. . |
| 0 687 079 A2 | 12/1995 | European Pat. Off. . |
| 2 237 706 | 5/1991 | United Kingdom . |
| WO 95/08896 | 3/1995 | WIPO . |

OTHER PUBLICATIONS

"European digital cellular telecommunications system (Phase 2); Multiplexing and multiple access on the radio path (GSM 05.02)", *Final Draft prETS 300 574*, May 1994.

"European digital cellular telecommunications system (Phase 2); Radio subsystem synchronisation (GSM 05.10)", *Draft prETS 300 579*, May 1995 Third Edition.

"European digital cellular telecommunications system (Phase 2); Cells with extra long propagation delays (GSM 03.30)," Section 4.10, published Jul. 1993 (descriptive recommendation).

"European digital cellular telecommunications system (Phase 2); Base Station Controller—Base Transceiver Station (BSC-BTS) interface—Interface principles (GSM 08.52)," *Draft prETS 300 593*, Aug. 1995 Third Edition.

*Primary Examiner*—Chau Nguyen
*Attorney, Agent, or Firm*—Burns, Doane, Swecker & Mathis, L.L.P.

[57] ABSTRACT

A method and apparatus for operating a first base station in a cellular telecommunications system, wherein the first base station has first and second transceivers that receive radio signals that are divided into uplink time slots, includes operating the first transceiver in synchronization with a first frame of uplink time slots and operating the second transceiver in synchronization with a second frame of uplink time slots, wherein the second frame of uplink time slots are offset by a predetermined amount relative to the first frame of uplink time slots. A united random access channel is formed by using a first time slot in each of the first and second transceivers in combination. A mobile station that transmits an uplink radio frequency burst may access the first base station by having the uplink radio frequency burst received by at least one of the first and second transceivers during that transceiver's first time slot. The uplink radio frequency burst may be received by both the first and second transceivers during the respective first time slots of the first and second transceivers. In this case, a comparison is made between the message contents, frame number and access delay of the bursts received by the first and second transceivers in order to determine that the bursts correspond to an access attempt by one mobile station.

22 Claims, 12 Drawing Sheets

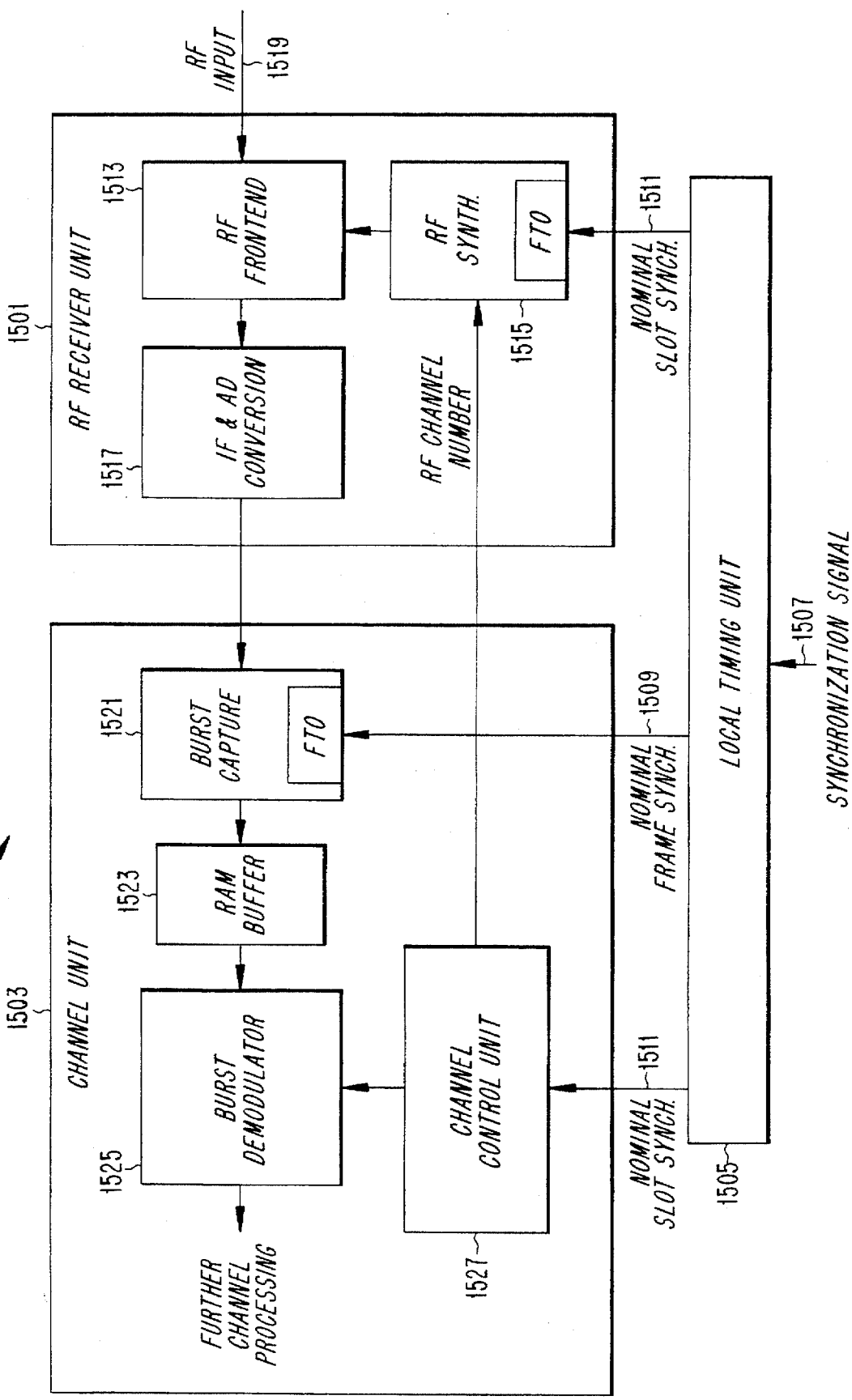

UNITED ACCESS CHANNEL FOR USE IN A MOBILE COMMUNICATIONS SYSTEM

BACKGROUND

The present invention relates to cellular telecommunications systems, and more particularly to a united access channel for use in a mobile communications system.

Cellular telecommunications systems are known, and a number of different cellular telecommunications standards have been developed to permit interoperability between competing systems. In a time division multiple access (TDMA) cellular radio system like the Global System for Mobile Communication (GSM), the propagation delay on the radio path between the base station and the mobile (subscriber) stations becomes significant as soon as communication needs to be maintained over a relatively large distance. A TDMA radio system must therefore be designed to accommodate a certain amount of such propagation delay in order to avoid having a transmission being received during a time slot that is subsequent to the actual intended time slot. A GSM system is normally designed to handle propagation delays between the serving base station and a mobile station corresponding to a distance of up to approximately 35 km. Extended cell ranges, greater than 35 km, can be handled, provided that certain arrangements are made in the base station transceiver.

In a GSM system, the mobile stations synchronize their local timing to signals received on the downlink channel (i.e., the channel for transmissions from the base station to the mobile station). Signals received by the base station on the uplink channel (i.e., the channel for transmissions from the mobile station to the base station) exhibit a varying time delay, relative to the corresponding signals transmitted on the downlink channel, depending on the varying propagation delay on the radio paths between the base station and the different mobile stations.

A GSM system deploys two different mechanisms to handle the varying propagation delay: extended guard periods and frame alignment. Details about these can be found in the published standards entitled "European digital cellular telecommunications system (Phase 2); Multiplexing and multiple access on the radio path (GSM 05.02)", *Final Draft prETS* 300 574, May 1994 (henceforth "GSM 05.02") and "European digital cellular telecommunications system (Phase 2); Radio subsystem synchronisation", *Draft prETS* 300 579, May 1995 Third Edition (henceforth "GSM 05.10"). The publications GSM 05.02 and GSM 05.10 are hereby incorporated by reference in their entireties.

The extended guard period, which is illustrated in FIG. 1, is used when the propagation delay is not known. This is the case during random access and asynchronous handover access. A frame of downlink time slot positions 101 at the base station are shown. A downlink radio path delay 103 causes the downlink radio frequency (RF) burst 105 to arrive correspondingly delayed at the mobile station. After a nominal uplink delay period 107, the mobile station transmits its uplink RF burst 109 on the uplink channel. However, in order to accommodate for the downlink radio path delay 103 of unknown duration, the mobile station's uplink RF burst 109 is substantially shorter than the target uplink time slot 2 in the frame of uplink time slots 111 in the radio base station.

The uplink RF burst 109 undergoes an uplink radio path delay 113, and arrives at the base station. By shortening the uplink RF burst 109, the uplink RF burst 109 may be delayed with respect to the target uplink time slot 2 in the frame of uplink time slots 111 without causing a disturbance in the adjacent time slot positions. Had the uplink RF burst 109 not been shortened, it would have extended into the next time slot by an amount indicated by the dotted line 115.

The delay of an uplink RF burst relative to the target time slot is here denoted by the expression "access delay." The difference in length between the target uplink time slot 2 in the frame of uplink time slots 111 and the shortened uplink RF burst 109 is denoted by the expression "extended guard period," and is used to accommodate the propagation delay of the radio path.

The extended guard period in a GSM system is dimensioned for access delays of up to approximately 235 microseconds (corresponding to the two-way propagation delay of a 35 km radio path).

The access delay perceived by the base station transceiver can be used to make an accurate estimate of the two-way propagation delay. When the propagation delay is known, then uplink frame alignment can be used. Uplink frame alignment refers to the practice of advancing the point of time for the transmission of a mobile station's RF burst by a period of time that equals the estimated two-way propagation delay. This mechanism is called mobile station (MS) timing advance, and is illustrated in FIG. 2. Downlink time slot positions 201 at the base station are shown. A downlink radio path delay 203 causes the downlink RF burst 205 to arrive correspondingly delayed at the mobile station. After a nominal uplink delay period 207 shortened by a timing advance amount 209, the mobile station transmits its uplink RF burst 211 on the uplink channel. Even though the transmitted uplink RF burst 211 undergoes an uplink radio path delay 213, an accurate timing advance amount 209 results in cancellation of the access delay in the base station, so that the guard period between adjacent time-slots can be reduced to a minimum. This is illustrated in FIG. 2 by the arrival of a (nearly) full size uplink RF burst 215 completely within the targeted one of the uplink time slot positions 217. This allows the RF channel to be optimally utilized. By continuously monitoring the access delay, an accurate timing advance can be maintained, matching even a varying propagation delay of the radio path.

Like the extended guard period, the maximum mobile station timing advance in a GSM system is dimensioned for a two-way propagation delay up to a corresponding 35 km radio path.

When the radio path in a GSM system extends beyond 35 km, the normal mechanisms for handling the corresponding propagation delay become insufficient. The problem can be solved by including "extended cell range" capability in the base station.

Different methods for the implementation of extended cell range have been proposed in the prior art. In "European digital cellular telecommunications system (Phase 2); Cells with extra long propagation delays (GSM 03.30)," published July 1993 (descriptive recommendation) (hereinafter, "GSM 03.30"), which is hereby incorporated by reference, Section 4.10 suggests that an additional time slot should be allocated for a radio connection operating at an extended cell range. When the two-way propagation delay exceeds the normal cell range (i.e., 35 km), the additional time slot serves as an additional guard period in the base station. That is, an uplink RF burst on that connection may be permitted to slide into the additional time slot, with the knowledge that it will not interfere with other radio connections. This technique is denoted here by the term "additional guard period" and is illustrated in FIG. 3. As shown in the figure, downlink time slot positions 301 are established at the base station. An excessive downlink radio path delay 303 causes the downlink RF burst 305 to arrive correspondingly delayed at the mobile station. After a nominal uplink delay period 307 shortened by a normal timing advance amount 309, the mobile station transmits its uplink RF burst 311 on the uplink channel. After being delayed by an excessive uplink radio path delay 313, the uplink RF burst 315 arrives at the base station. However, because the uplink time slot positions 317 each include the additional guard period described above, the received uplink RF burst 315 does not interfere with a next time slot.

Referring now to FIG. 4, a different method is proposed in U.S. patent application Ser. No. 07/859,962, ("the '962 Application") filed by Bodin et al. on Mar. 30, 1992 (also published on Oct. 6, 1993 as European Patent Publication Number 0 564 429 A2), which is hereby incorporated by reference in its entirety. As taught in the '962 Application, the complete frame of uplink time slots 401 is delayed in the base station by a certain amount of time, here denoted fixed timing offset ($T_{FTO}$). The timing offset introduced in the base station cancels a certain amount of propagation delay, corresponding to a minimum distance, D, to a mobile station. Uplink frame alignment 403 can then be used to cancel propagation delay within an interval of 35 km exceeding the distance, D. The combined effect of fixed timing offset plus uplink frame alignment provides an operable range from the distance D up to a distance D+35 km, where:

$$D = T_{FTO} \times 0.150 \text{ km/microsecond.}$$

By having a number of transceivers in a base station, each associated with an individual fixed timing offset, thereby covering a different sub-range of the desired cell range, a continuous cell range beyond the normal 35 km limit can be achieved. For example, in order to cover an extended cell range of 60 km, two transceivers can be used, one being assigned a fixed timing offset $T_{FTO}(1)=0$ microseconds (normal cell range), and the other a fixed timing offset $T_{FTO}(2) \approx 170$ microseconds (extended cell range). By adding more transceivers, with increasing fixed timing offsets, even larger cells can be covered.

A clear benefit with the fixed timing offset, compared to the use of additional guard periods, is that it permits a more efficient utilization of transceiver equipment. Ideally, all time slots in a transceiver can actively be used with a fixed timing offset, whereas in the technique illustrated in FIG. 3, every second time slot cannot be actively used for transmission because it may need to be set off for use as an additional guard period.

A major problem with the implementation of extended cell range on the basis of the additional guard period as described above is that, in some implementations, existing base station equipment does not allow an uplink RF burst to slide between adjacent time slots, as intended when using additional guard periods. In practice, such sliding requires the base station transceivers to be able to detect RF bursts on the uplink channel within an access window (time slot) that is substantially wider than the normal time slot. This is not always possible with existing equipment.

A better solution for such equipment can be to implement an extended cell range on the basis of the fixed timing offset principle, as described above. However, the existing state of the art has not provided a solution for the initial access problem, that is, the detection of random access and handover access in a cell featuring an extended cell range. In those situations, the implementation of extended cell range still relies on the use of additional guard periods. In order to avoid the use of additional guard periods, it is desirable to provide some means for a mobile station to address an appropriate sub-range at the initial access of the cell.

SUMMARY

It is therefore an object of the present invention to provide a mechanism for allowing a cell to have an extended cell range based on the fixed timing offset principle, while allowing a mobile station's initial access (e.g., upon random access or handover access) to be assigned a channel having a suitable fixed timing offset.

In accordance with one aspect of the present invention, the foregoing and other objects are achieved by a method and apparatus for operating first base station in a cellular telecommunications system, wherein the first base station has first and second transceivers that receive radio signals that are divided into uplink time slots. The method and apparatus includes operating the first transceiver in synchronization with a first frame of uplink time slots and operating the second transceiver in synchronization with a second frame of uplink time slots, wherein the second frame of uplink time slots is offset by a predetermined amount relative to the first frame of uplink time slots. A united random access channel is formed by using a first time slot in each of the first and second transceivers in combination. A mobile station that transmits an uplink radio frequency burst may access the first base station by having the uplink radio frequency burst received by at least one of the first and second transceivers during that transceiver's first time slot.

In another aspect of the invention, the uplink radio frequency burst may be received by both transceivers during the respective first time slots. In this case, a comparison is made between the message contents, frame number and access delay of the bursts received by the first and second transceivers in order to determine whether the bursts correspond to an access attempt by one mobile station.

In still another aspect of the invention, the remaining time slots (i.e., time slots other than the first time slot in a frame) in each of the first and second frames of uplink time slots may be utilized to serve a corresponding sub-range within the cell.

In yet another aspect of the invention, handover of a mobile station from a first base station to a second base station includes using information about relative locations between the first and second base stations to identify, in the second base station, a frame of uplink time slots having a timing offset that is predicted to be appropriate for receiving an uplink transmission from the mobile station to the second base station; and selecting a second time slot in the identified frame of time slots and assigning the selected second time slot for use by the mobile station after the handover.

Handover may also be accomplished by using information about radio path delay between the mobile station and the first base station to identify, in the second base station, a frame of uplink time slots having a timing offset that is predicted to be appropriate for receiving an uplink transmission from the mobile station to the second base station.

In another aspect of the invention, handover of the mobile station from the first to the second base station may be initiated on the basis of information about radio path delay between the mobile station and the first base station.

BRIEF DESCRIPTION OF THE DRAWINGS

The objects and advantages of the invention will be understood by reading the following detailed description in conjunction with the drawings in which:

FIG. 15. is a block diagram of a transceiver unit for carrying out the invention.

DETAILED DESCRIPTION

Figure 1:
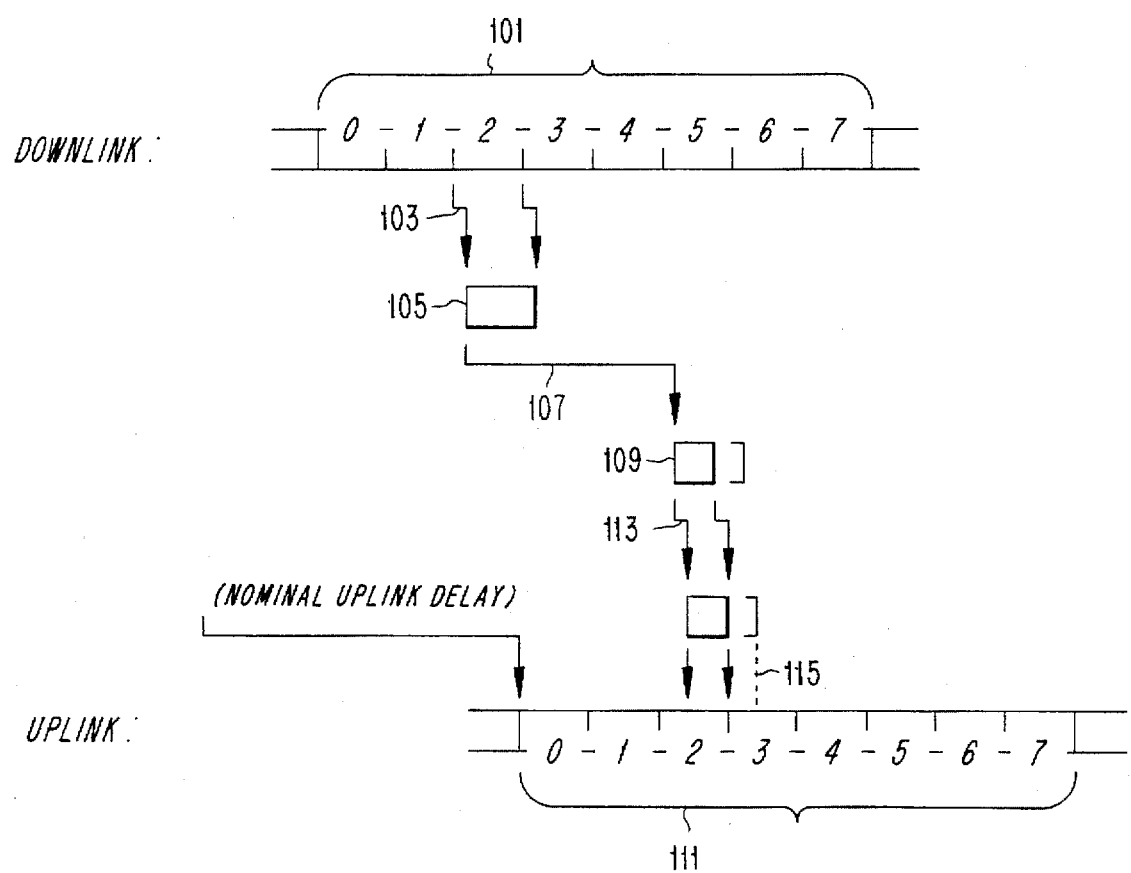
FIG. 1 is an illustration of the prior art use of an extended guard period.
Figure 2:
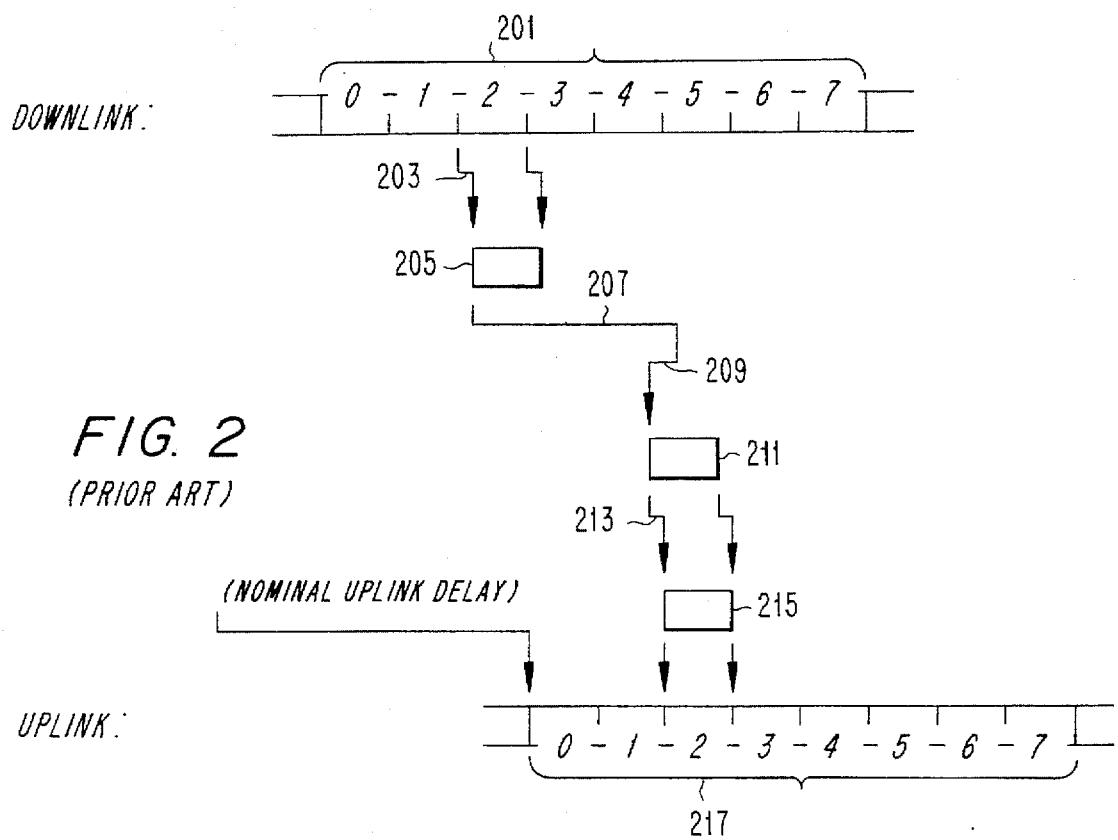
FIG. 2 is an illustration of the prior art use of mobile station (MS) timing advance.
Figure 3:
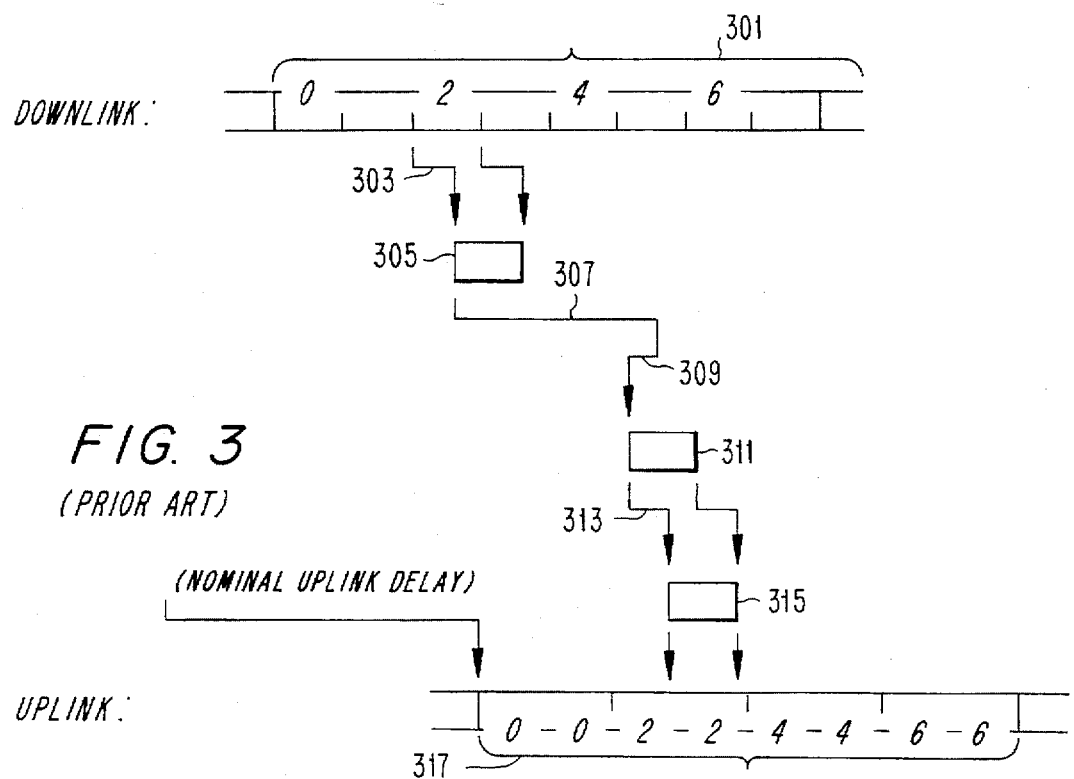
FIG. 3 is an illustration of the prior art use of an additional guard period to extend cell coverage.
Figure 4:
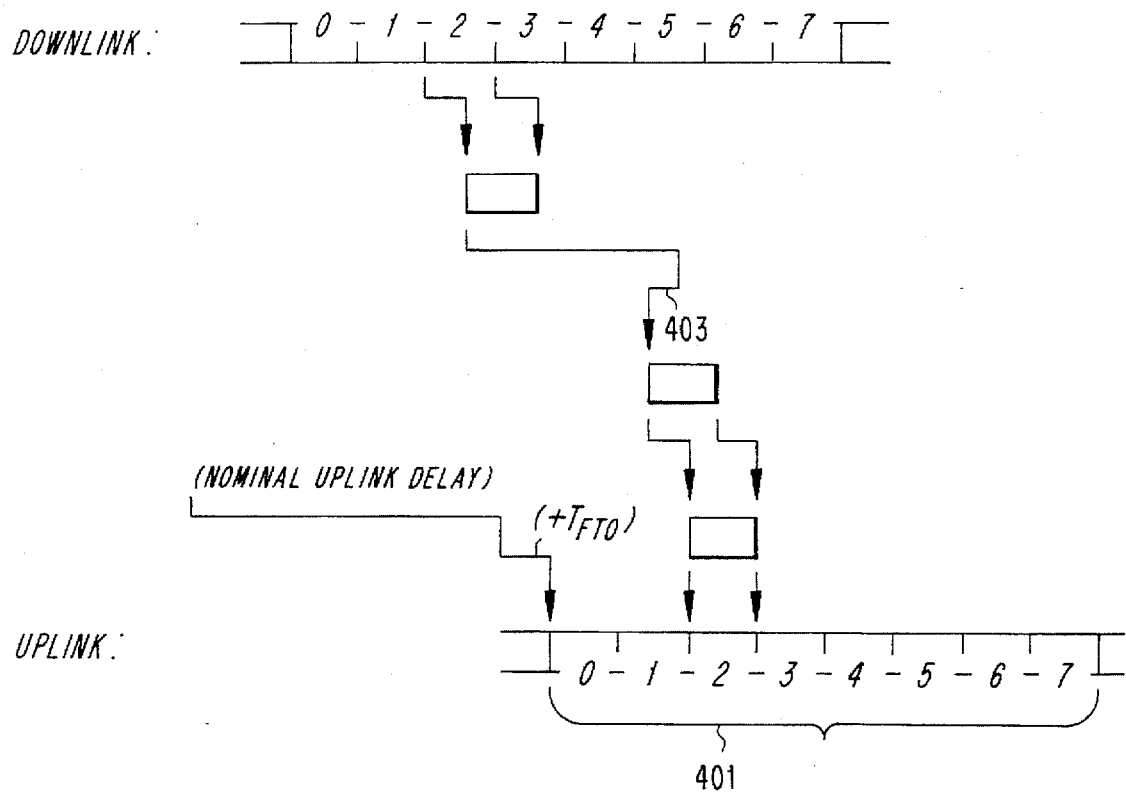
FIG. 4 is an illustration of yet another prior art technique for extending cell coverage.

The various features of the invention will now be described with respect to the figures, in which like parts are identified with the same reference characters.

In the following description, an exemplary embodiment of the invention is shown for use in a GSM system. However, the invention is not limited to this embodiment, but can instead be applied to provide wide range coverage in other digital cellular telephone systems that use time division multiple access (TDMA) techniques.

In one aspect of the invention, an extended cell range is achieved by including a fixed timing offset, as described above in the BACKGROUND section of this specification. The various radio resources in a cell providing extended cell range are associated with different timing offsets, arranged in such a way that the desired cell range is entirely covered.

In another aspect of the invention, a random access channel is provided by a series of time slots, each one being associated with a corresponding fixed timing offset that covers a predefined sub-range of the cell. Different timing offsets are used for the different time slots, such that the complete series of time slots will cover the entire cell.

Handover into the cell is supported by selecting a suitable sub-range for the connection in the destination cell. A channel is then assigned in the destination cell covering that sub-range, where the sub-range is characterized by a corresponding fixed timing offset. Input parameters for making the sub-range selection include the geographical locations of the base stations serving the original and destination cells, and the estimated distance before the handover between the mobile station and the base station serving the original cell. The inventive method also supports the case when the two cells are served by the same base station, and the case when a handover is to take place between channels within the same cell.

The inventive techniques for providing a random access channel in a cell having an extended range will now be described in greater detail with reference to FIG. 5. When dealing with a GSM transceiver, a random access channel may cover a distance range from zero to approximately 35 km so long as the transmitted burst is received within a window of time ("access window") in relation to a nominal burst position. For example, GSM 05.10 § 5 indirectly prescribes that an access burst (GSM 05.02 § 5.2.7) must be received within an interval of 0–64 bit periods relative to the intended nominal burst position. By applying a timing offset, that range can be adjusted to cover a range from an arbitrary minimum distance D to a distance D+35 km.

In order to cover an extended cell range of more than 35 km, the cell is divided into a number, n, of sub-ranges, each characterized by a distance $D_i$ where i=0, 1, . . . , n:

sub-range $D_0$ . . . $D_0$+35 km where $D_0$=0;

sub-range $D_i$ . . . $D_i$+35 km where $D_{i-1} \leq D_i \leq D_{i-1}$+35 km.

Thus, in accordance with this aspect of the invention, a random access channel is provided which is supported by a series of time slots located in overlapping sub-ranges, all having the same time slot number and operating on the same RF channel. In this way, a virtually united random access channel is provided.

Figure 5:
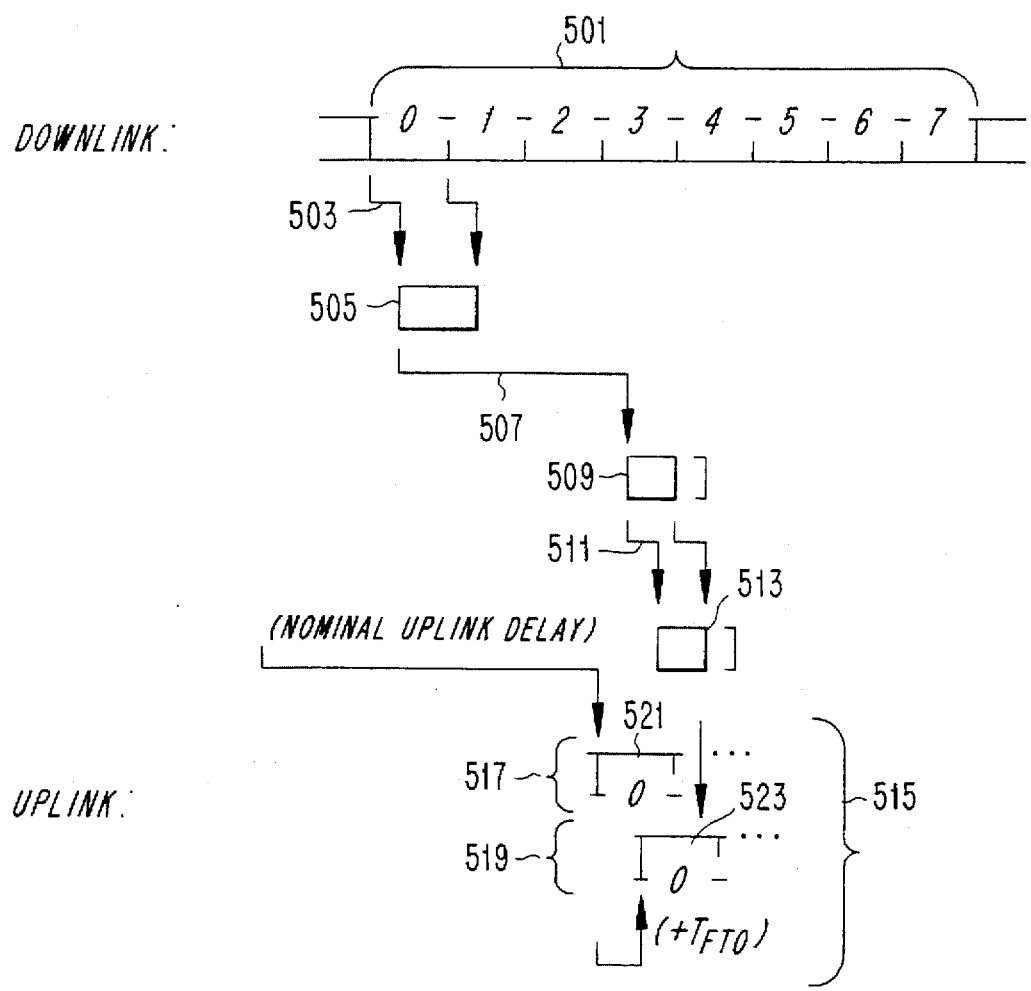
FIG. 5 is a diagram showing the creation of a united random access channel for extending cell coverage in accordance with one aspect of the invention.

This can be seen in FIG. 5. At the top of the figure, the base station's downlink time slot positions 501 are shown. Because of a possibly extra long downlink radio path delay 503, the mobile station receives a downlink RF burst 505 delayed by an unknown amount. After a nominal uplink delay period 507, the mobile station transmits a shortened uplink RF burst 509, which provides an extended guard period. After undergoing a possibly extra long uplink radio path delay 511, the shortened uplink burst 513 arrives at the base station. As illustrated, the shortened uplink burst 513 overlaps two time slots in the united access channel 515. In this case, the united access channel 515 comprises a first time slot 521 in a first frame of uplink time slots 517 and a first time slot 523 in a second frame of uplink time slots 519. The first frame of uplink time slots 517 is characterized by a fixed timing offset of $T_{FTO}$=0, and therefore corresponds to an inner sub-range within the cell. The second frame of uplink time slots 519 is characterized by a fixed timing offset of $T_{FTO}$>0, and therefore corresponds to an outer sub-range within the cell. Each of the first and second frames of uplink time slots 517, 519 are on the same RF channel that the mobile station is transmitting on. Note that this means that the next time slot in the inner sub-range (i.e., inner sub-range time slot 1) cannot also be designed to receive on this same RF channel, since this use would potentially be interfered with by the overlapping portion of the outer sub-range's time slot 0.

Operation of the united random access channel will now be described. A mobile station that wishes to make a random access into the cell sends an uplink RF burst 509 at the appointed time slot number and RF channel for the united random access channel, regardless of the distance to the base station. The uplink RF burst 509 is preferably shortened to provide an extended guard period that effectively provides a larger access window in one of the first and second frames of uplink time slots 517, 519. The uplink RF burst 513 arrives at the base station, and is detected by those time slots associated with a timing offset matching the actual distance between the mobile station and the base station.

When a random access attempt (RF burst) is detected by one of the time slots supporting the random access channel, an effective access delay is determined. The effective access delay may be determined by first determining the access delay relative to the time slot of the particular frame (e.g., that one of the first and second frames of uplink time slots 517, 519) in which the RF burst was detected. Then, by adding the associated timing offset, the effective access delay is calculated. The effective access delay may then be utilized as a measure that is independent of which time slot was involved.

Since the time slots supporting the united random access channel do overlap, the uplink RF burst 513 can be detected in more than one time slot simultaneously. This phenomenon is here denoted by the term "multiple detection." Such duplicates can be identified by virtue of the fact that the conveyed messages have the same message contents, are being received at the same TDMA frame and time slot number, and have matching effective access delays. When a set of duplicate access messages has been identified, it is thereafter treated as a united access, meaning that subsequent actions taken by the network are done once for an assumed single mobile station, instead of one for each detected message.

There may be some spread in the effective access delay estimation for various reasons. One reason for this is that a radio signal is always subjected to a certain degree of time dispersion as a result of multipath propagation. Time dispersion can be especially pronounced when the signal is transmitted over a long distance. Consequently, a spread on the order of one or two bit periods should be allowed for. Variations in effective access delay estimations can also result from the type of equipment design being employed in the receivers. Because of the spread in the effective access delay estimation, strictly equal access delay values should not be expected between duplicate messages. Instead, in accordance with another aspect of the invention, a window should be applied, meaning that different effective access delays should be compared with a range of access delay values. Those RF bursts having access delays that fall within a given window of access delay values should be matched together. The window size should be adjusted to span the typical access delay spread of the radio path. For a GSM system, a window size of up to ten or twenty microseconds should normally be appropriate.

In accordance with another aspect of the invention, handover of a call from one cell to another having an extended cell range (referred to as "handover access") is enabled. This will now be described in greater detail. When a handover of a mobile station from one cell into a destination cell having an extended cell range is to occur, the distance between the mobile station and the base station for the destination cell needs to be predicted. This prediction is necessary in order to determine a suitable sub-range for the connection in the destination cell, and to make it possible to select a target channel within that sub-range.

Figure 6:
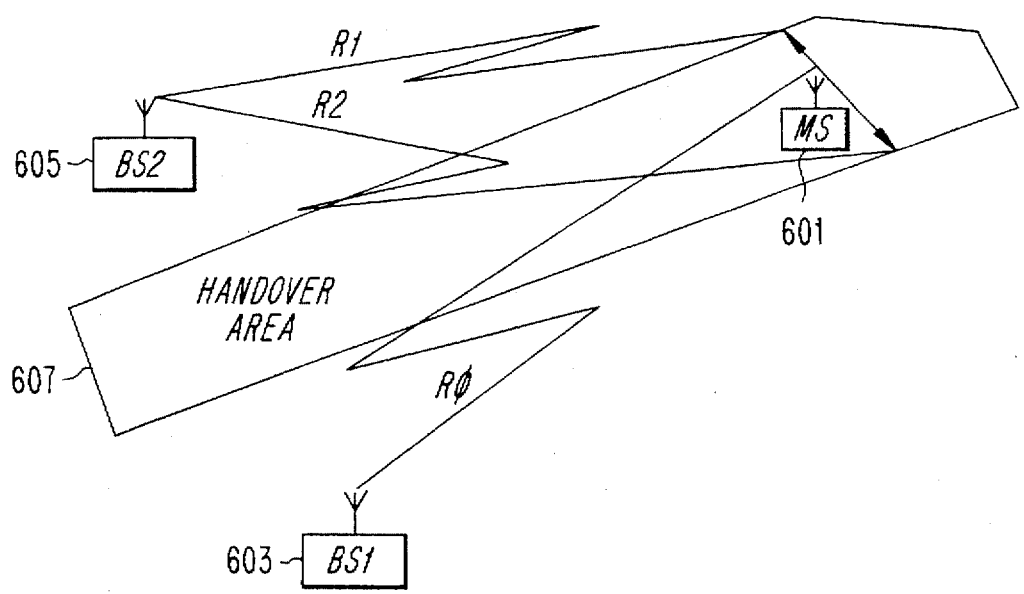
FIG. 6 is a diagram that shows a technique for handing over a call from one base station to another in accordance with one aspect of the invention.

Referring now to FIG. 6, a mobile station 601 has a radio connection to a first base station 603 that serves the mobile station's original cell. When the telecommunications network determines that a handover is to take place to a second base station 605, the distance $R_0$ between the mobile station 601 and the first base station 603 is indirectly known from the status of the MS frame alignment of the radio connection in the original cell. It is assumed that the handover area 607 (i.e., the area where handover between the two cells takes place) is roughly known. Based on that information, as well as information about the relative locations of the first and second base stations 603 and 605, the possible distance between the mobile station 601 and the second base station 605 serving the destination cell can be estimated as being within the interval $[R_1 \ldots R_2]$. This estimated range of distances is then used as the basis for selecting a suitable sub-range in the destination cell.

The potential width of the destination's distance interval $[R_1 \ldots R_2]$ can be quite large. For that reason, a certain degree of overlap between adjacent sub-ranges should be established, in order to make it possible to find suitable sub-ranges for handover.

In a cellular system where means are provided for determining the position of a mobile station, the width of the interval $[R_1 \ldots R_2]$ can be considerably reduced, thereby improving the precision in the selection of suitable sub-ranges for handover. Such positioning means can be based on information about the direction from the first base station to the mobile station, obtained for instance by a fine sectorization of cells being served by the first base station. Other positioning means can be based on measurements of the observed timing offset made by the mobile station on the first and second base station, provided that the base stations are either finely synchronized, or that the actual timing offsets of the first and the second base stations are known. Positioning of a mobile station can, of course, also be obtained by external means, such as a GPS receiver, or equivalent, connected to the mobile station.

In practice, the explicit calculation of the interval $[R_1 \ldots R_2]$ is normally not necessary. The most suitable sub-range can often be determined strictly as a function of $R_0$. That function can initially be set up as a result of cell planning, and then further refined as a result of practical experience in each case. In another aspect of the invention, $R_0$ can be used as an initial handover criteria, thereby avoiding making handover decisions in such situations where a suitable sub-range in the destination cell is difficult to predict.

Two particular handover situations are of special interest: 1) the case where the base stations of the original and the destination cells are located very close to one another or at the same place, and 2) the case where the base stations of the original and destination cells are located so far apart from one another that a handover can always be done into the outermost sub-range of the destination cell.

In the case where the base stations of the original and the destination cells are located very close to one another or at the same place, $R_0 \approx R_1 \approx R_2$ and a suitable destination sub-range can easily be determined based on $R_0$. This is the case when handover is to be made between sector cells operated from the same base station site. This situation also arises during intra cell handover, for example, between different sub-ranges within one and the same cell.

The second handover situation mentioned above occurs when the base stations of the original and destination cells are located so far apart from one another that a handover can always be done into the outermost sub-range of the destination cell. This can quite easily be achieved in sector cells if a fairly regular cell pattern is used, and extended cell ranges are restricted to being no more than approximately twice the normal (i.e., non-extended) range, which is quite reasonable in many situations. With this restriction, only two sub-ranges are needed in each cell: an inner sub-range covering the normal range, and an outer sub-range, adjusted to the desired far range of the cell.

Figure 7:
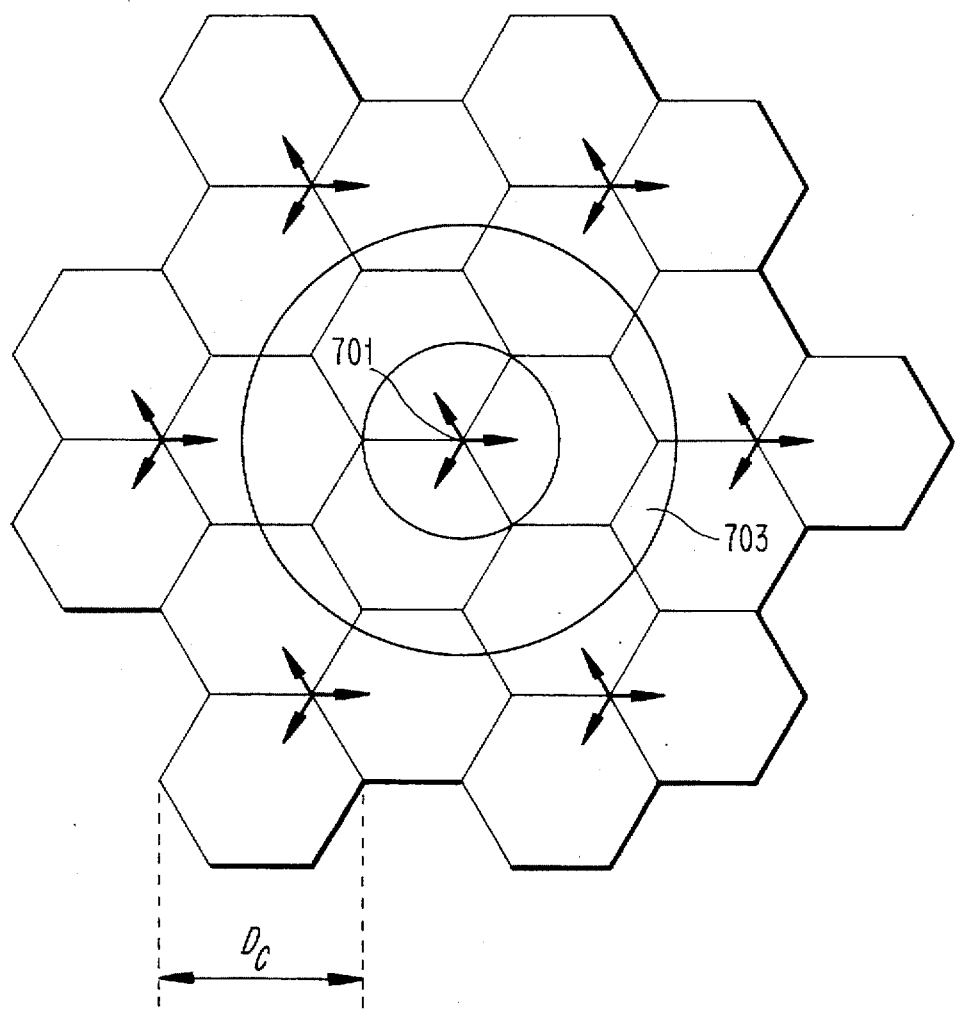
FIG. 7 illustrates a regular cell pattern using three sector cells at each base station site, and having an extended cell coverage area in accordance with the invention.

Referring now to FIG. 7, a regular cell pattern using three sector cells at each base station site is shown. The cell diameter $D_c$ (distance from a base station site to the farthest corner of the corresponding cells) is less than twice the normal cell range. The outermost sub-range of the cells served from the base station site 701 in the center of the figure is defined by the annulus 703. It can be seen that the cell borders to the adjacent cells served from the surrounding sites are completely covered by the outermost sub-range. Consequently, as long as handover takes place before the cell diameter is exceeded ($R_o \leq D_c$) the outermost sub-range is always the most suitable sub-range at handover between cells that are served by base stations at different sites.

The teachings described above with respect to the second situation above can also easily be applied to cell sectorizations defined by other than three sector cells. It can also be applied in omnidirectional cells, where a base station is located at the center of each cell. In fact, in this latter case the situation is theoretically even better: ideally, cell ranges of up to 120 km or even 130 km could be achieved by means of, for example, four sub-ranges: 0 ... 35 km, 32 ... 67 km, 64 ... 99 km and 95 ... 130 km. The distance between neighbor base station sites is 225 km. A handover must be initiated from a first cell before the distance of 130 km is reached. This means that the distance in the destination cell cannot be less than 95 km, so that the outermost sub-range is the only possible choice. However, in practice cell ranges of that size are impractical in most cellular systems that operate in the 1 GHz band and above. In order to provide a radio horizon on that order, an antenna tower with an effective height (i.e., a height above the surrounding land) of almost 1,000 m would be required. Furthermore, the radio path loss over such a distance would be great.

In practice, cell patterns are usually not perfectly regular. Therefore, the particular sub-ranges, and the handover and cell selection criteria to be applied in each case should always be adjusted to the practical properties of each cell.

In a GSM system, the random access channel may be combined with a dedicated channel at the same time slot number (i.e., time slot O) and the same RF channel (for control signalling purposes, i.e., SDCCH/4). The different channels are then multiplexed on a TDMA frame number basis, as described in detail in the publication GSM 05.02.

In another aspect of the invention applicable to such a channel combination, a dedicated channel (or sub-channel) can be associated with any one of the time slots supporting the united random access channel. The resulting channel is referred to here as a "combined random access channel." The dedicated channel (or sub-channel) may thereby cover the entire extended cell. When a handover of a mobile station to such a dedicated channel is to occur, the telecommunications network decides which particular time slot shall be used, and thereby decides which particular sub-range the radio connection to the mobile station shall be associated with during that call. This is done individually each time a channel is activated, and can be done differently for different sub-channels, if a dedicated channel is divided into such.

In the handover procedure, a suitable sub-range for the combined random access channel is selected on the basis of the same criteria as described above for the handover access.

In another aspect of the invention, a mobile station may be handed over to a dedicated channel immediately after the initial random access on the united random access channel (i.e., immediate assignment, according to the GSM vocabulary). In this case, the distance $R_o$ is determined on the basis of the effective access delay at the random access, as described above.

The effects of frequency hopping will now be considered in connection with the invention. The application of frequency hopping to a TDMA system using fixed timing offsets in accordance with the invention requires careful planning in order to avoid a conflicting use of any given frequency on two or more sub-ranges. In prior art systems, adjacent time slots in a cell are fully orthogonal, meaning that sets of channels have been arranged in such a way that they do not interfere with each other. ("Nearly orthogonal" arrangements may also be used, in which an acceptably small level of interference does occur between some channels.) However, in a cell using different timing offsets for different sub-ranges as taught here, uplink frames are no longer perfectly synchronized in different sub-ranges, so that time slots having adjacent time slot numbers are no longer automatically orthogonal without the application of strict frequency division. This is in contrast to a non-hopping implementation of the invention, where strict frequency division can always be maintained (except, of course, for the united random access channel, where the same RF frequency is deliberately used for the different sub-ranges).

In one aspect of the invention, a general guideline is that frequency division should be applied within the TDMA frame between adjacent time slots having different timing offsets. In practice, this means that, to the extent possible, an RF channel should not be used by time slots associated with different timing offsets within the same TDMA frame. When this cannot be avoided, such as in the case described below with respect to the united random access channel, some time slots should be left unused in order to avoid frequency violations from occurring within the cell.

In order to avoid frequency violations at the TDMA frame borders, some of the time slots in the TDMA frame must remain unused. In particular, inner sub-ranges may not use the first time slot in the TDMA frame, and outer sub-ranges may not use the last time slot in the TDMA frame.

Special care must be paid to the united random access channel (URACH), because it needs to be supported in a plurality of sub-ranges, at the same time slot number and at the same RF channel. This means that even if frequency hopping is not generally used in the cell, the receivers handling the URACH must perform frequency hopping before and after a time slot used for the URACH, in all but possibly one sub-range.

It also means that the RF channel used for the UPACH must not be used during the time-slot number immediately before the URACH, except in the innermost sub-range, and that it must not be used in the time slot number immediately after the URACH, except in the outermost sub-range. The reason for this is to avoid having two mobile stations interfere with one another on the same RF channel.

Another aspect to practicing the invention involves the downlink part of the common control channel (CCCH) and the broadcast channels (FCCH, SCH and BCCH). These are transmitted, according to GSM specifications, in the time slot 0 on the RP channel, $C_B$, corresponding to the united random access channel. The downlink channels cover the entire cell range, consisting of the superimposed set of uplink sub-ranges. The downlink channels corresponding to a united random access channel are thus transmitted in a single frame of downlink time slots 501, as illustrated in FIG. 5.

For the case where a combined random access channel is used (i.e., a united random access channel sharing a time slot with a dedicated channel or sub-channel, such as SDCCH/ 4), the downlink part of the dedicated control channel is multiplexed into the same frame of downlink time slots in the RF channel, $C_B$, as is used for the downlink part of the common control channel (CCCH) and the broadcast channels (FCCH, SCH and BCCH). Multiplexing is done on a frame number basis, according to the publication GSM 05.02.

A number of valid configurations of the united random access channel for a GSM network will now be described. It should be understood that these embodiments are merely illustrative of the invention, and that other embodiments are possible, not only for a GSM network, but also for cellular telecommunications systems designed in accordance with standards, other than GSM, which utilize TDMA as one factor in defining channels. Examples of such other standards include the Digital Advanced Mobile Phone System (D-AMPS) (EIA interim Standard, IS-54) utilized in the United States, and also the Japanese TDMA system.

The following notations for non-hopping RF channels and for hopping RF channel sequences are used:

| | |
|---|---|
| n | Number of RF channels in a cell. |
| $C_B$ | Non-hopping RF channel that may be used as a control channel (BCCH, CCCH and URACH) or alternatively as a traffic channel (TCH) or a dedicated control channel (SDCCH/8) |
| $C_1 \ldots C_{n-1}$ | Non-hopping RF channels that are not used for BCCH, CCCH and URACH; only traffic or dedicated control channels. |
| $HS_{B:1} \ldots HS_{B:n}$ | Hopping RF channel sequences, each including $C_B$, where $HS_{B:1} \ldots HS_{B:n}$ are all mutually orthogonal. |
| $HS_{N:1} \ldots HS_{N:n-1}$ | Hopping RF channel sequences, none of which include $C_B$, where $HS_{N:1} \ldots HS_{N:n-1}$ are all mutually orthogonal. |

Figure 8:
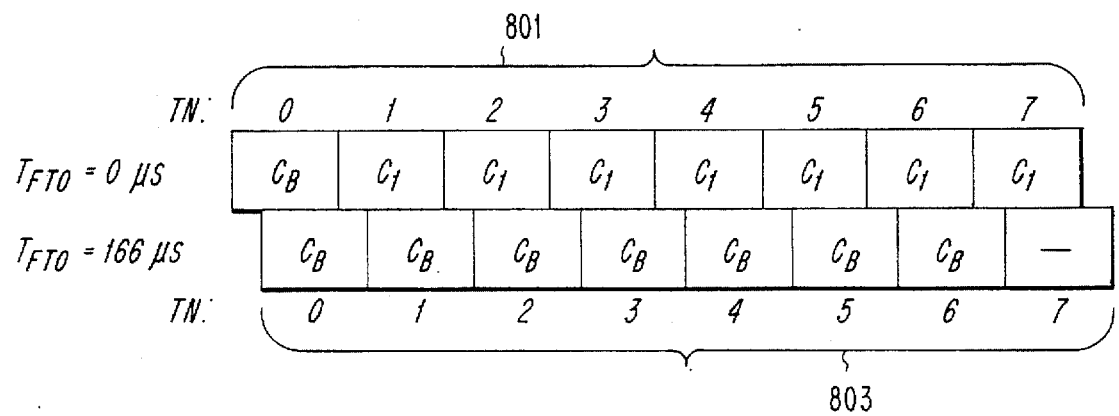
FIG. 8 is a diagram of a non-hopping cell configuration with two sub-ranges in accordance with one embodiment of the invention.

A non-hopping cell configuration with two sub-ranges will now be described with respect to FIG. 8. In this example, the two sub-ranges are used to cover a total cell range of up to 60 km. Frequency hopping is not used. The frequency channel $C_B$ is used in time slots 0 through 6 in the outer sub-range and in time slot 0 (URACH) of the inner sub-range. It will be recognized that, in accordance with GSM specifications, the uplink time slot 0 in each of the inner and outer sub-ranges is used for the common control channel that the mobile station uses to transmit its random access RF burst. In the remaining time slots (i.e., time slots 1 through 7), the frequency channel $C_B$ may be used as a dedicated signalling or traffic channel. However, in this embodiment the frequency channel $C_B$ is not available for use in time slot number 7 in the outer sub-range because collisions would otherwise occur with the uplink use of this same $C_B$ in time slot number 0 (URACH) of the next inner sub-range TDMA frame.

The available number of traffic channels (TCH) and time slots used for dedicated signalling channels (SDCCH/8) in this embodiment is thirteen. The particulars of this embodiment are as follows:

| First sub-range 801: | $T_{FTO}$ = 0 microsec | | |
|---|---|---|---|
| | (sub-range: 0 .. 35 km) | | |
| | TN=0 | TN=1..7 | |
| Logical channels: | BCCH+CCCH, +SDCCH/4, URACH (uplink) | TCH (or SDCCH/8) | |
| RF channel(s): | $C_B$ | $C_1$ | |
| Second Sub-range 803: | $T_{FTO}$=166 microsec | | |
| | (sub-range: 25 .. 60 km) | | |
| | TN=0 | TN=1..6 | TN=7 |
| Logical channels: | SDCCH/4, URACH (uplink) | TCH (or SDCCH/8) | Not used |
| RF channel(s): | $C_B$ | $C_B$ | |

Notes:
1) A SDCCH/4 sub-channel can be activated at either sub-range. The downlink part of an optional SDCCH/4 sub-channel is preferably transmitted by the same transceiver that is serving the uplink part of that SDCCH/4 sub-channel.
2) No logical channels are assigned to Time slot Number (TN) 7 in the second sub-range 803 because $C_B$ is used for the URACH in TN = 0 in the first sub-range 801.

Figure 9:
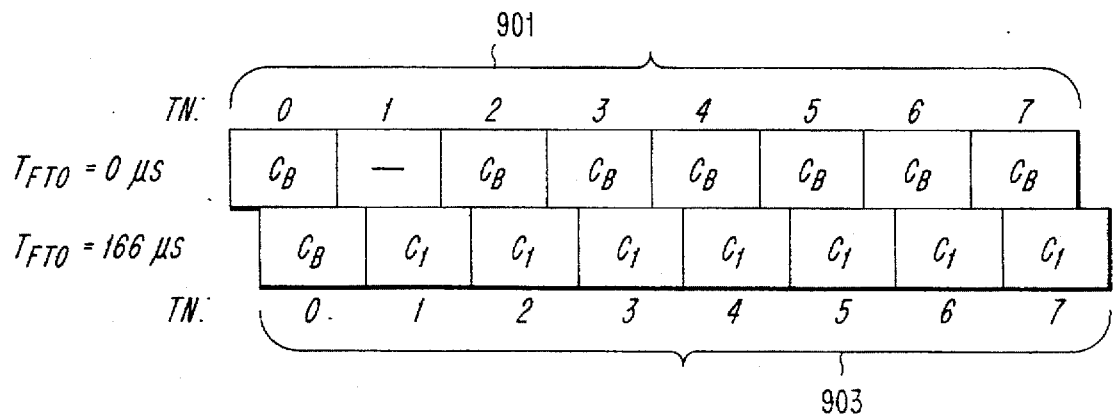
FIG. 9 is a diagram of a non-hopping cell configuration with two sub-ranges in accordance with an alternative embodiment of the invention.

An alternative embodiment of a non-hopping cell configuration with two sub-ranges will now be described with respect to FIG. 9. As with the previous example, the first and second sub-ranges 901, 903 are used to cover a total cell range of up to 60 km, and frequency hopping is not used. The first sub-range 901 is the inner sub-range, and the second sub-range 903 is the outer sub-range. This embodiment differs from the previous example in that the frequency channel $C_B$ is used in all but one of the time slots of the first sub-range 901. The frequency channel $C_B$ iS not available for use during time slot number 1 of the first sub-range 901 because collisions would otherwise occur with the uplink use of this same $C_B$ in time slot number 0 (URACH) of the next TDMA frame of the second sub-range 903.

The available number of traffic channels (TCH) and time slots used for dedicated signalling channels (SDCCH/8) in this embodiment is thirteen. The particulars of this embodiment are as follows:

| First sub-range 901: | $T_{FTO}$ = 0 microsec | | |
|---|---|---|---|
| | (sub-range: 0 .. 35 km) | | |
| | TN=0 | TN=1 | TN=2..7 |
| Logical channels: | BCCH+CCCH, +SDCCH/4, URACH (uplink) | Not used | TCH (or SDCCH/8) |
| RF channel(s): | $C_B$ | | $C_1$ |
| Second Sub-range 903: | $T_{FTO}$=166 microsec | | |
| | (sub-range: 25 .. 60 km) | | |
| | TN=0 | TN=1..7 | |
| Logical channels: | SDCCH/4, URACH (uplink) | TCH (or SDCCH/8) | |
| RF channel(s): | $C_B$ | $C_1$ | |

Notes:
1) A SDCCH/4 sub-channel can be activated in either sub-range. The downlink part of an optional SDCCH/4 sub-channel is preferably transmitted by the same transceiver that is serving the uplink part of that SDCCH/4 sub-channel.
2) No logical channels are assigned to Time slot Number (TN) 1 in the first sub-range 901 because $C_B$ is used for the UPACH in TN = 0 in the second sub-range 903.

Figure 10:
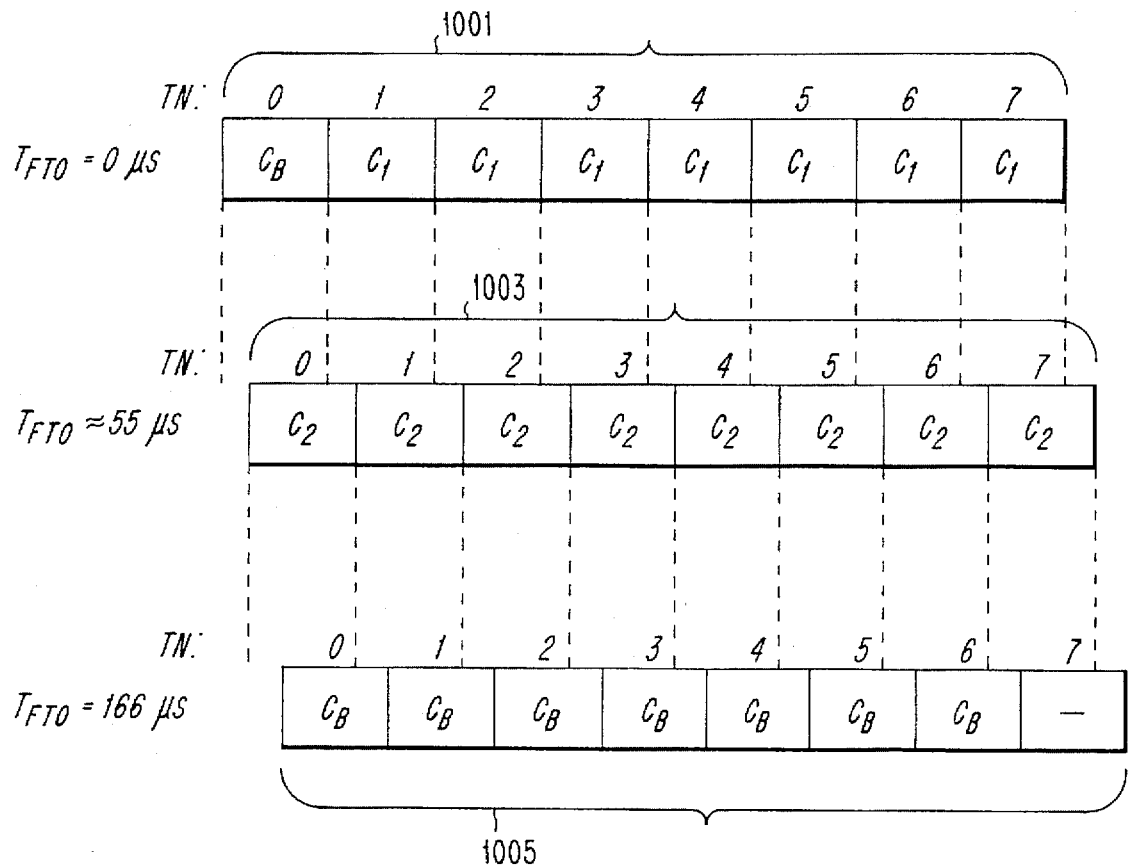
FIG. 10 is a diagram of a non-hopping cell configuration with three sub-ranges in accordance with another embodiment of the invention.

An embodiment of a non-hopping cell configuration with three sub-ranges will now be described with respect to FIG. 10. As with the previous example, a total cell range of up to 60 km is covered, and frequency hopping is not used. However, an additional sub-range is added in between the previous two sub-ranges in order to increase cell capacity in the mid-range. This covers more than 50% of the total coverage area. Thus, first, second and third sub-ranges 1001, 1003, 1005 are shown. The second sub-range 1003 does not require a random access channel because the complete cell is already covered by the other two (i.e., time slot 0 of the first sub-range 1001 and time slot 0 of the third sub-range 1005), which means that all eight time slots in the second sub-range 1003 may be utilized for traffic channels (TCH).

The available number of traffic channels and time slots used for dedicated signalling channels in this embodiment is twenty-one. The particulars of this embodiment are as follows:

| First sub-range 1001: | $T_{FTO}$ = 0 microsec | |
|---|---|---|
| | (sub-range: 0 .. 35 km) | |
| | TN=0 | TN=1 .. 7 |
| Logical channels: | BCCH+CCCH, +SDCCH/4, URACH (uplink) | TCH (or SDCCH/8) |
| RF channel(s): | $C_B$ | $C_1$ |
| Second sub-range 1003: | $T_{FTO}$ ≈ 55 microsec | |
| | (sub-range: 8 .. 43 km) | |
| | TN=0 .. 7 | |
| Logical channels: | TCH (or +SDCCH/8) | |
| RF channel(s): | $C_2$ | |
| Third Sub-range 1003: | $T_{FTO}$=166 microsec | |
| | (sub-range: 25 .. 60 km) | |
| | TN=0 | TN=1 .. 6 | TN=7 |
| Logical channels: | SDCCH/4, URACH (uplink) | TCH (or SDCCH/8) | Not used |
| RF channel(s): | $C_B$ | $C_B$ | |

Notes:
1) A SDCCH/4 sub-channel can be activated in any of the sub-ranges. The downlink part of an optional SDCCH/4 sub-channel is preferably transmitted by the same transceiver that is serving the uplink part of that SDCCH/4 sub-channel.
2) No logical channels are assigned to Time slot Number (TN) 7 in the third sub-range 1005 because $C_B$ is used for the URACH in TN = 0 in the first sub-range 1001.

Figure 11:
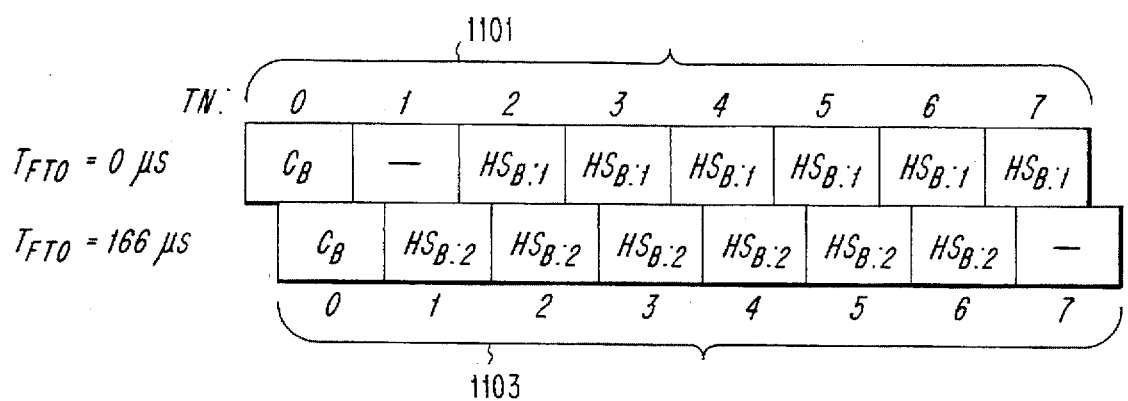
FIG. 11 is a diagram of a hopping cell configuration with two sub-ranges in accordance with another embodiment of the invention.

An embodiment of a hopping cell configuration with two sub-ranges will now be described with respect to FIG. 11. As with the previous examples, a total cell range of up to 60 km is covered. However, in this case frequency hopping is used on all traffic channels as well as on SDCCH/8. Frequency hopping is also applied to the frequency channel $C_B$.

First and second sub-range 1101, 1103 are shown. The united random access channel comprises time slot 0 in each of the first and second sub-ranges 1101, 1103. Time slot number 1 in the first sub-range 1101 and time slot number 7 in the second sub-range 1103 are not available, because collisions would otherwise occur on uplink $C_B$ in time slot number 0 of the adjacent sub-range.

The available number of traffic channels (TCH) and time slots used for dedicated signalling channels (SDCCH/8) in this embodiment is twelve. The particulars of this embodiment are as follows:

| First sub-range 1101: | $T_{FTO}$ = 0 microsec | | |
|---|---|---|---|
| | (sub-range: 0 .. 35 km) | | |
| | TN=0 | TN=1 | TN=2 .. 7 |
| Logical channels: | BCCH+CCCH, +SDCCH/4, URACH (uplink) | Not used | TCH (or SDCCH/8) |
| RF channel(s): | $C_B$ | | $HS_{B:1}$ |
| Second sub-range 1103: | $T_{FTO}$ ≈ 55 microsec | | |
| | (sub-range: 25 .. 60 km) | | |
| | TN=0 | TN=1 .. 6 | TN=7 |
| Logical channels: | SDCCH/4, URACH (uplink) | TCH (or SDCCH/8) | Not used |
| RF channel(s): | $C_B$ | $HS_{B:2}$ | |

Notes:
1) A SDCCH/4 sub-channel can be activated in either sub-range. The downlink part of an optional SDCCH/4 sub-channel is preferably transmitted by the same transceiver that is serving the uplink part of that SDCCH/4 sub-channel.
2) No logical channel is assigned to Time slot Number (TN) 1 in the first sub-range 1101 because $C_B$ is used for the URACH in TN = 0 in the second sub-range 1003.
3) No logical channel is assigned to TN 7 in the second sub-range 1103 because $C_B$ is used for the URACH in TN = 0 in the first sub-range 1001.

The absence of a logical channel in TN 7 in the second sub-range 1103 warrants further discussion. As mentioned above, it is important to maintain frequency division between sub-ranges (with the exception of the URACH channel, $C_B$) in order to avoid interference. Frequency division can be maintained in a frequency hopping system so long as hopping sequences are arranged such that a hop on one logical channel (i.e., a traffic channel or signalling channel of some kind) is always made onto an RF channel that is not concurrently used by another logical channel in the system. For purposes of this discussion, two kinds of frequency hopping systems should be distinguished: closely hopping systems and loosely hopping systems.

In a closely hopping system, hopping sequences and channels are arranged such that there is a logical channel mapped onto every available RF channel at any particular instant of time. In such a system, frequency division can only be maintained so long as frequency hopping is implemented as a simultaneous permutation of RF channels among a certain set of logical channels. The embodiment depicted in FIG. 11 assumes a closely hopping system, and therefore leaves TN 7 in the second sub-range 1103 unused. This is to avoid having a conflict between the channel assigned to TN 7 in the second sub-range 1103 and the channel hopped onto in the next occurrence of TN 0 in the first sub-range 1101.

In a loosely hopping system, hopping sequences and channels are arranged such that there is always at least one available RF channel upon which there is no logical channel mapped. Thus, in a loosely hopping system, it is possible to maintain frequency division without necessarily synchronizing the hopping of different logical channels, because a hop can always be made onto the at least one available RF channel. Even in systems where there is only one RF channel left unassigned, a hop onto this channel leaves available the channel from which the hop was made, so hopping can continue ad infinitum. Thus, in a loosely hopping system, it is possible to maintain frequency division without necessarily synchronizing the hopping of different logical channels. If the embodiment depicted in FIG. 11 were to be applied to a loosely hopping system, it would be permissible to assign a channel to TN 7 in the second sub-range 1103, so long as that channel is guaranteed not to conflict with $HS_{B:1}$ in TN 7 of the first sub-range 1101, or with $C_B$ in TN 0 of the first sub-range 1001.

Figure 12:
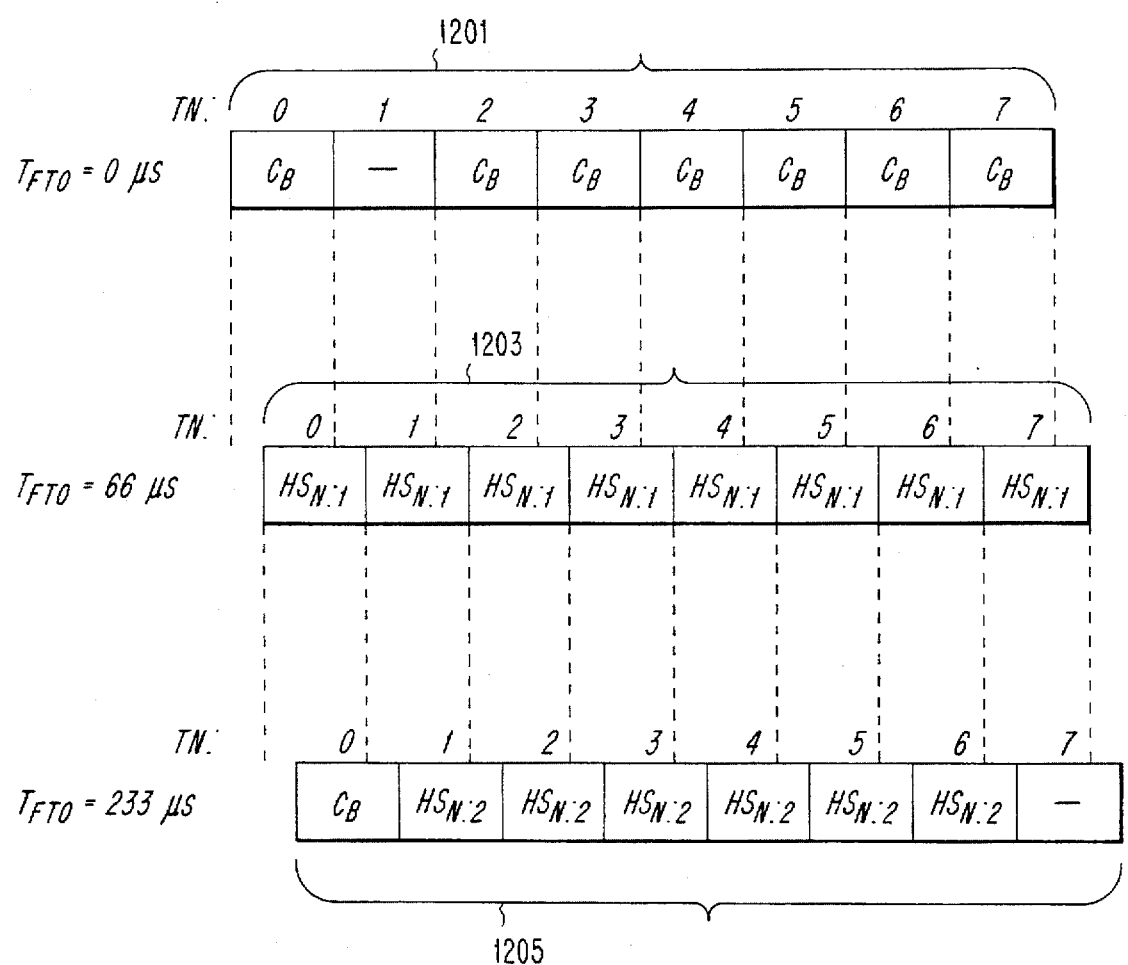
FIG. 12 is a diagram of a partially hopping cell configuration with three sub-ranges in accordance with another embodiment of the invention.

An embodiment of a partially hopping cell configuration with three sub-ranges will now be described with respect to FIG. 12. With this configuration, a total cell range of up to 70 km is covered by the provision of first, second and third sub-ranges 1201, 1203, 1205. The first sub-range 1201 is offset by 0 microseconds, the second sub-range 1203 is offset by 66 microseconds, and the third sub-range 1205 is offset by 233 microseconds. Frequency hopping is used on traffic channels (and SDCCH/8) in the second and third sub-ranges 1203, 1205, but not in the first sub-range 1201, where the frequency channel $C_B$ is used exclusively. Furthermore, the hopping sequences ($HS_{N:1}$, $HS_{N:2}$) used in the second and third sub-ranges 1203, 1205 do not include the frequency channel $C_B$. The depicted embodiment assumes a closely hopping system. Therefore, time slot number 1 in the first sub-range 1201 is not used because collisions would otherwise occur with the use of the frequency channel $C_B$ in time slot 0 of the third sub-range 1205. Also, time slot number 7 in the third sub-range 1205 is left unused in order to avoid a conflict with the frequency that is hopped onto in the next occurrence of TN 0 in the second sub-range 1203. If a loosely hopping system is implemented, the system can be designed to permit assignment of a frequency to TN 7 in the third sub-range 1205.

The available number of traffic channels (TCH) and time slots used for dedicated signalling channels (SDCCH/8) in this embodiment is twenty. The particulars of this embodiment are as follows:

| First sub-range 1201: | $T_{FTO}$ = 0 microsec | | |
|---|---|---|---|
| | (sub-range: 0 .. 35 km) | | |
| | TN=0 | TN=1 | TN=2..7 |
| Logical channels: | BCCH+CCCH, +SDCCH/4, URACH (uplink) | Not used | TCH (or SDCCH/8) |
| RF channel(s): | $C_B$ | $C_1$ | |
| Second sub-range 1203: | $T_{FTO}$ = 66 microsec | | |
| | (sub-range: 10 .. 45 km) | | |
| | TN=0 .. 7 | | |
| Logical channels: | TCH (or +SDCCH/8) | | |
| RF channel(s): | $HS_{N:1}$ | | |
| Third Sub-range 1203: | $T_{FTO}$=233 microsec | | |
| | (sub-range: 35 .. 70 km) | | |
| | TN=0 | TN=1 .. 6 | TN=7 |
| Logical channels: | SDCCH/4, URACH (uplink) | TCH (or SDCCH/8) | Not used |
| RF channel(s): | $C_B$ | $HS_{N:2}$ | |

Notes:
1) A SDCCH/4 sub-channel can be activated in any of the first and third sub-ranges 1201, 1205. The downlink part of an optional SDCCH/4 sub-channel is preferably transmitted by the same transceiver that is serving the uplink part of that SDCCH/4 sub-channel.
2) No logical channels are assigned to Time slot Number (TN) 1 in the first sub-range 1201 because $C_B$ is used for the URACH in TN = 0 in the third sub-range 1205.
3) A closely hopping system is depicted. Therefore, orthogonal hopping is not possible at the TDMA frame border of more than one sub-range because collisions would otherwise occur between time slots 0 and 7 of different sub-ranges. If a loosely hopping system had been depicted it would have been possible to assign a frequency to TN 7 of the third sub-range 1205.

Figure 13:
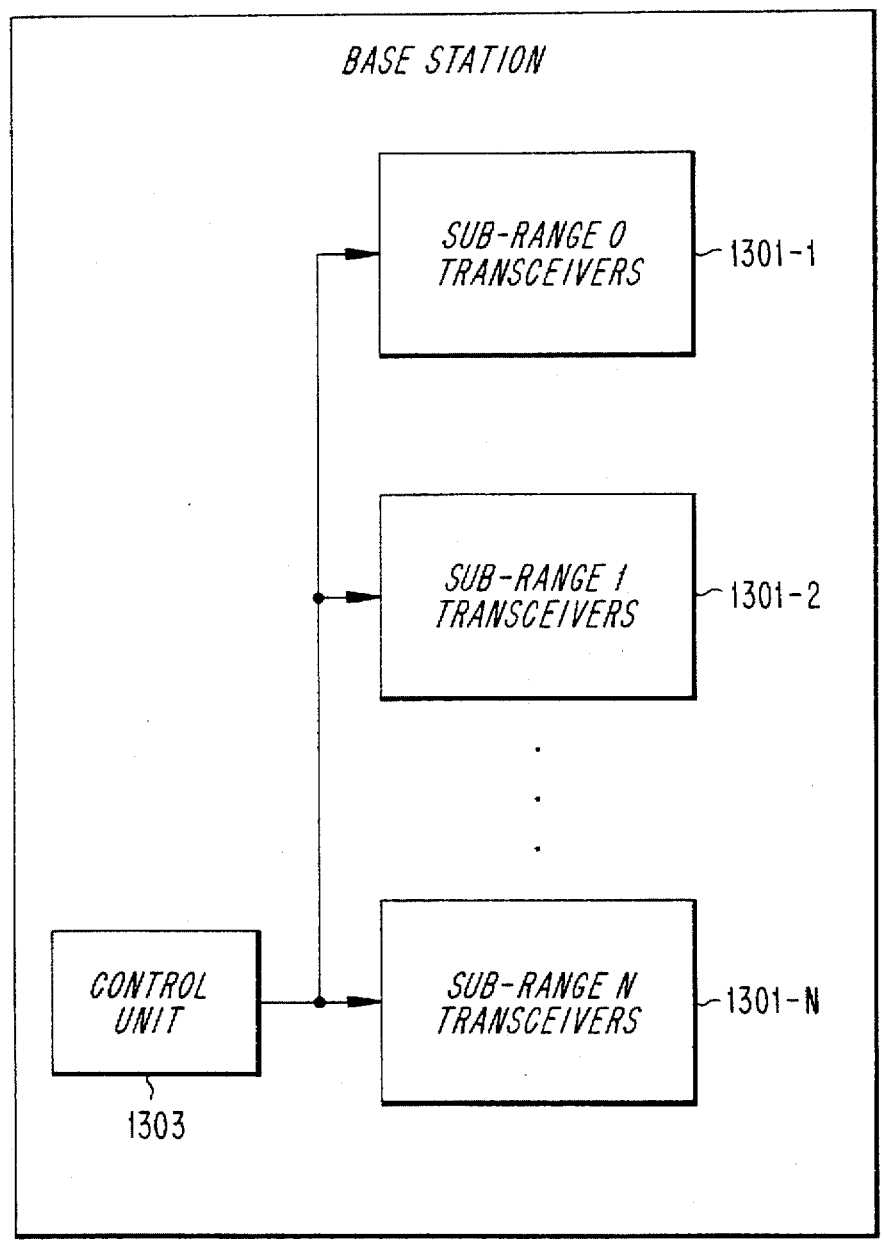
FIG. 13 is a high-level block diagram of a base station for practicing the invention.

A high-level block diagram of a base station for practicing the invention is shown in FIG. 13. The base station includes groups of transceivers 1301-1, 1301-2, . . . , 1301-N, allocated in correspondence with N sub-ranges that are to be supported. A control unit 1303 operates the transceivers 1301-1, 1301-2, . . . , 1301-N in accordance with the principles outlined above.

Figure 14:
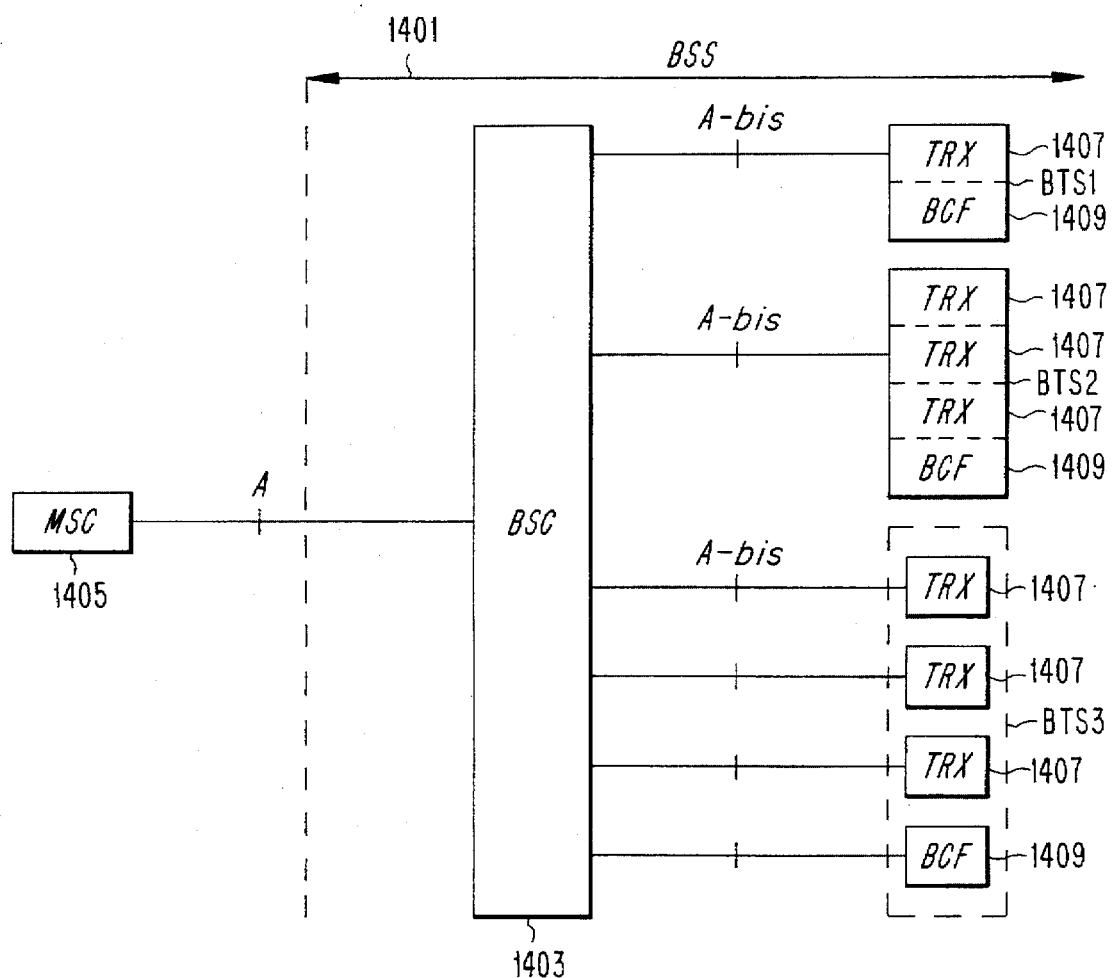
FIG. 14 is a block diagram of the invention as applied in a GSM telecommunications system.

More particularly, the invention may be applied in a GSM telecommunications system as shown in FIG. 14. A base station system 1401 comprises a base station controller (BSC) 1403 connected to, in this example, three base transceiver stations BTS1, BTS2 and BTS3 over an A-bis interface. The BSS 1401 is controlled by a mobile switching center (MSC) 1405, to which it is connected over the A interface.

The base transceiver stations BTS1, BTS2 and BTS3 shown in FIG. 14 should be understood to each be a logical structure that comprises a number of different transceivers (TRX) 1407 and a base control function (BCF) 1409. Each TRX 1407 corresponds to a function which is capable of handling one frame of eight time slots on the radio interface (not shown in the figure). In a physical implementation of a BSS 1401, TRX functionality can be implemented as separate physical units for each TRX function. Alternatively, a TRX function may be divided into separate physical units for each time slot. In another embodiment, a number of TRX functions may be implemented in a single unit. In still another embodiment, a complete BTS can be implemented in a single unit.

In a preferred embodiment of the invention, each TRX 1407 is implemented in a separate physical unit. Referring now to FIG. 15, a transceiver unit 1407 for carrying out the invention includes an RF receiver unit 1501, a channel unit 1503 and a local timing unit 1505.

The local timing units 1505 in different TRXs 1407 are synchronized by means of a common synchronization signal 1507 provided by the control unit 1303 as a part of the BCF 1409. The common synchronization signal 1507 comprises a reference for the TDMA frame position and the current TDMA frame number. The local timing unit 1505 in each TRX 1407 provides the channel unit 1503 and RF receiver unit 1501 with local synchronization signals for nominal TDMA frame sync (nominal frame sync 1509) and time slot positions (nominal slot synch 1511).

The RF receiver unit 1501 includes an RF front end 1513, which amplifies and converts the received RF signal to an intermediate frequency (IF) signal at a predetermined intermediate carrier frequency. The RF front end 1513 is controlled by an RF synthesizer 1515, which provides a variable frequency reference for the desired RF channel. The RF synthesizer 1515 can change the frequency reference within the guard period between adjacent time slots in the uplink TDMA frame. The desired channel number is controlled by a signal supplied by the channel unit 1503. The change of the frequency reference is triggered by the nominal slot synch signal 1511 from the local timing unit 1507, delayed by an optional fixed timing offset, in order to support implementation of extended range cells according to the invention. The RF receiver unit 1501 further comprises an IF and analog to digital (A/D) conversion unit 1517, which converts the IF signal into a continuous stream of digitally encoded samples of the received RF signal 1519.

The channel unit 1503 includes a burst capture unit 1521, which receives the continuous stream of digitally encoded samples of the received RF signal from the RF receiver unit 1501. The burst capture unit makes a recording of a complete frame of time slots into an intermediate random access memory (RAM) buffer 1523. The recording is triggered by the nominal frame synch signal 1509 from the local timing unit 1505, delayed by an optional fixed timing offset. By means of the delayed triggering of the recording, the image of a received burst can be positioned within a predetermined nominal address range within the intermediate RAM buffer 1523, corresponding to a predetermined time slot number, for different fixed timing offset values.

The channel unit 1503 further comprises a burst demodulator unit 1525, which can demodulate the image of a received RF burst that has been recorded in the intermediate RAM buffer 1523. The nominal position of the image of the desired burst is then determined by the time slot number. The burst demodulator unit receives instructions from a channel control unit 1527 specifying the time slot number, the type of burst, and other characteristics of the particular burst to be demodulated, which information is necessary for carrying out the demodulation process.

The channel control unit 1527 included in the channel unit 1503 thus controls the reception process by providing instructions to 1) the RF synthesizer 1515 in the RF receiver unit 1501 designating which RF channel to use for a particular time slot, and 2) the burst demodulator unit 1525 designating which time slot number, type of burst, and other burst characteristics to apply for the demodulation process. In order to be able to provide those instructions at the appropriate time for the reception of a burst, the channel control unit 1527 is also synchronized to the TDMA frame structure of the uplink channel by means of a nominal slot synch signal 1511 from the local timing unit 1505. The local timing unit 1505 also provides TDMA frame synch and frame number information to the channel control unit 1527.

Operation of the exemplary TRX 1407 will now be discussed. When an access attempt from a mobile station on a random access channel is detected by the burst demodulator 1525, the channel unit 1503 applies further processing, including channel decoding and check sum evaluation, to extract the conveyed message of information contained in that burst.

Information about the access delay (i.e., the timing offset of that access attempt relative to the nominal uplink time slot position) is obtained by the burst demodulator unit 1525 in terms of an offset of the image of a received burst in the intermediate RAM buffer 1523 in relation to the predetermined nominal position for the image in the intermediate RAM buffer 1523. Optionally, that offset is added to the fixed timing offset used as triggering delay in the burst capture unit in order to calculate the effective access delay of the access attempt.

Information about the TDMA frame number for an access attempt is obtained by the channel control unit 1527 from the synchronization signals received from the local timing unit 1505, which signals are derived from the common synchronization signal 1507 provided by the base station control unit 1403.

The information about the TDMA frame number, message contents, and access delay of an access attempt is collected by the channel unit 1503 and forwarded over the A-bis interface to the BSC 1403. In a typical embodiment of the invention, different channel units 1503 handle the united random access channel for a first and a second frame of time slots, associated with different fixed timing offsets. Information about access attempts made by mobile stations on the first and the second frame of time slots are then collected by the BSC 1403, which can then respond to such access attempts in the appropriate way.

When an access attempt from a mobile station is detected independently on both the first and the second frame of time slots, the BSC 1403 compares the obtained information about the duplicated detection. On the basis of this comparison, the BSC 1403 can determine that both detections derived from the same mobile station, and therefore further treat it as a single access attempt according to the invention.

In an alternative embodiment of the invention, duplicate access detections can be detected by a separate access filtering function in the base station. Such an access filtering function can be implemented as a software application in either of the control unit 1303 (see FIG. 13) in the base station or in one of the channel units 1503 in the base station. In that case, the information about detected access attempts in the first and second channel units 1503 is first forwarded to the access filtering function. The access filtering function compares the obtained information, and can thereby detect duplicated access attempts. The access filtering function then forwards information about the received access attempts to the BSC 1403 in order for that to take further action. When a duplicated access attempt has been detected, it is reported to the BSC 1403 as a single access attempt according to the invention.

The downlink part of the common control channel (CCCH) and the broadcast channels (FCCH, SCH and BCCH) in a GSM system only needs to be transmitted by one of the transceivers 1301-1, . . . , 1301-N in the base station. In a preferred embodiment, that transmitter also handles the reception of one sub-range of the united random access channel. A second transceiver is used for reception of a second sub-range of the united random access channel. The second transceiver does not transmit on the downlink channel in the corresponding time slots.

When a combined random access channel is used, the dedicated control channel SDCCH/4, or a sub-channel thereof, can be activated in either one of the different sub-ranges of the united random access channel. In a preferred embodiment, both the uplink and the downlink part of such a dedicated control channel, or a sub-channel thereof, is served by the transceiver that serves the united random access channel of that sub-range. A second transceiver, serving a second sub-range of the united random access channel, does not transmit on the downlink channel in the time slots corresponding to the dedicated control channel, or the sub-channel thereof.

It will be recognized that the invention avoids the need for additional guard periods. This means that conventional base station equipment, not having the capability of handling additional guard periods, can nonetheless be used to implement cells having an extended range. This is a clear advantage, because redesign and replacement of critical transceiver devices can be avoided.

The absence of additional guard periods also means that an efficient utilization of time slots can be obtained. All dedicated channels in a cell can be handled within a single time slot, thereby reducing to a minimum the waste of time slot resources that are otherwise associated with the use of additional guard periods.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first base station in a cellular telecommunications system, wherein the first base station has first and second transceivers that receive radio signals that are divided into uplink time slots, the method comprising the steps of:

operating the first transceiver in synchronization with a first frame of uplink time slots;

operating the second transceiver in synchronization with a second frame of uplink time slots, wherein the second frame of uplink time slots are offset by a predetermined amount of time relative to the first frame of uplink time slots; and using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is received by the second transceiver during the second transceiver's first time slot, wherein the uplink radio frequency burst is received by both the first and second transceivers during the respective first time slots of the first and second transceivers, and further comprising the steps of:

detecting a first access attempt during the first time slot of the first transceiver;

detecting a second access attempt during the first time slot of the second transceiver; and comparing at least one of message contents, frame number and access delay of the first and second access attempts and determining that they correspond to an access attempt by one mobile station on the basis of the comparison.

2. A method of operating a first base station in a cellular telecommunications system, wherein the first base station has first and second transceivers that receive radio signals that are divided into uplink time slots, the method comprising the steps of:

operating the first transceiver in synchronization with a first frame of uplink time slots;

operating the second transceiver in synchronization with a second frame of uplink time slots, wherein the second frame of uplink time slots are offset by a predetermined amount of time relative to the first frame of uplink time slots; and using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is received by the second transceiver during the second transceiver's first time slot, and further comprising the step of:

using the first time slots of the first and second transceivers to support a dedicated channel in addition to supporting the united random access channel, wherein the dedicated channel includes a plurality of sub-channels, and further comprising the step of activating one of the sub-channels independently of other sub-channels during one of the first time slots of the first and second transceivers.

3. A method of operating a first base station in a cellular telecommunications system, wherein the first base station has first and second transceivers that receive radio signals that are divided into uplink time slots, the method comprising the steps of:

operating the first transceiver in synchronization with a first frame of uplink time slots;

operating the second transceiver in synchronization with a second frame of uplink time slots, wherein the second frame of uplink time slots are offset by a predetermined amount of time relative to the first frame of uplink time slots; and using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is received by the second transceiver during the second transceiver's first time slot, wherein a second time slot in one of the first and second frames of uplink time slots serves a dedicated channel used by a second mobile station, and further comprising the step of handing over service of the second mobile station to a second base station, wherein the step of handing over service comprises the steps of:

using information about relative locations between the first and second base stations to identify, in the second base station, a frame of uplink time slots having a timing offset that is predicted to be appropriate for receiving an uplink transmission from the second mobile station to the second base station; and selecting a second time slot in the identified frame of time slots and assigning the selected second time slot for use by the second mobile station after the handover.

4. The method of claim 3, wherein the dedicated channel used by the second mobile station is a traffic channel for subscriber speech.

5. The method of claim 3, wherein the dedicated channel used by the second mobile station is a signalling channel for control purposes.

6. The method of claim 3, further comprising the step of using information about radio path delay between the second mobile station and the first base station to initiate the step of handing over service of the second mobile station to the second base station.

7. A method of operating a first base station in a cellular telecommunications system, wherein the first base station has first and second transceivers that receive radio signals that are divided into uplink time slots, the method comprising the steps of:

operating the first transceiver in synchronization with a first frame of uplink time slots;

operating the second transceiver in synchronization with a second frame of uplink time slots, wherein the second frame of uplink time slots are offset by a predetermined amount of time relative to the first frame of uplink time slots; and using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is recieved by the second transceiver during the second transceiver's first time slot, wherein a second time slot in one of the first and second frames of uplink time slots serves a dedicated channel used by a second mobile station, and further comprising the step of handing over service of the second mobile station to a second base station, wherein the step of handing over service comprises the steps of:

using information about path delay between the second mobile station and the first base station to identify, in the second base station, a frame of uplink time slots having a timing offset that is predicted to be appropriate for receiving an uplink transmission from the second mobile station to the second base station; and selecting a second time slot in the identified frame of time slots and assigning the selected second time slot for use by the second mobile station after the handover.

8. The method of claim 7, wherein the dedicated channel used by the second mobile station is a traffic channel for subscriber speech.

9. The method of claim 7, wherein the dedicated channel used by the second mobile station is a signalling channel for control purposes.

10. The method of claim 7, wherein the step of using information about radio path delay between the second mobile station and the first base station to identify, in the second base station, the frame of uplink time slots further comprises using information about relative locations between the first and second base stations to identify, in the second base station, the frame of uplink time slots having the timing offset that is predicted to be appropriate for receiving an uplink transmission from the second mobile station to the second base station.

11. The method of claim 7, further comprising the step of using information about radio path delay between the second mobile station and the first base station to initiate the step of handing over service of the second mobile station to the second base station.

12. An apparatus for operating a first base station in a cellular telecommunications system, wherein the first base station has first and second transceivers that receive radio signals that are divided into uplink time slots, the apparatus comprising:

means for operating the first transceiver in synchronization with a first frame of uplink time slots;

means for operating the second transceiver in synchronization with a second frame of uplink time slots, wherein the second frame of uplink time slots are offset by a predetermined amount of time relative to the first frame of uplink time slots; and means for using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is received by the second transceiver during the second transceiver's first time slot, wherein the uplink radio frequency burst is received by both the first and second transceivers during the respective first time slots of the first and second transceivers, and further comprising:

means for detecting a first access attempt during the first time slot of the first transceiver;

means for detecting a second access attempt during the first time slot of the second transceiver; and means for comparing at least one of message contents, frame number and access delay of the first and second access attempts and determining that they correspond to an access attempt by one mobile station on the basis of the comparison.

13. An apparatus for operating a first base station in a cellular telecommunications system, wherein the first base station has first and second transceivers that receive radio signals that are divided into uplink time slots, the apparatus comprising:

means for operating the first transceiver in synchronization with a first frame of uplink time slots;

means for operating the second transceiver in synchronization with a second frame of uplink time slots, wherein the second frame of uplink time slots are offset by a predetermined amount of time relative to the first frame of uplink time slots; and means for using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is received by the second transceiver during the second transceiver's first time slot, and further comprising:

means for using the first time slots of the first and second transceivers to support a dedicated channel in addition to supporting the united random access channel, wherein the dedicated channel includes a plurality of sub-channels, and further comprising means for activating one of the sub-channels independently of other sub-channels during one of the first time slots of the first and second transceivers.

14. An apparatus for operating a first base station in a cellular telecommunications system, wherein the first base station has first and second transceivers that receive radio signals that are divided into uplink time slots, the apparatus comprising:

means for operating the first transceiver in synchronization with a first frame of uplink time slots;

means for operating the second transceiver in synchronization with a second frame of uplink time slots, wherein the second frame of uplink time slots are offset by a predetermined amount of time relative to the first frame of uplink time slots; and means for using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is received by the second transceiver during the second transceiver's first time slot, wherein a second time slot in one of the first and second frames of uplink time slots serves a dedicated channel used by a second mobile station, and further comprising means for handing over service of the second mobile station to a second base station, wherein the means for handing over service comprises:

means for using information about relative locations between the first and second base stations to identify, in the second base station, a frame of uplink time slots having a timing offset that is predicted to be appropriate for receiving an uplink transmission from the second mobile station to the second base station; and means for selecting a second time slot in the identified frame of time slots and assigning the selected second time slot for use by the second mobile station after the handover.

15. The apparatus of claim 14, wherein the dedicated channel used by the second mobile station is a traffic channel for subscriber speech.

16. The apparatus of claim 14, wherein the dedicated channel used by the second mobile station is a signalling channel for control purposes.

17. The apparatus of claim 14, further comprising means for using information about radio path delay between the second mobile station and the first base station to initiate operation of the means for handing over service of the second mobile station to the second base station.

18. An apparatus for operating a first base station in a cellular telecommunications system, wherein the first base station has first and second transceivers that receive radio signals that are divided into uplink time slots, the apparatus comprising:

means for operating the first transceiver in synchronization with a first frame of uplink time slots;

means for operating the second transceiver in synchronization with a second frame of uplink time slots, wherein the second frame of uplink time slots are offset by a predetermined amount of time relative to the first frame of uplink time slots; and means for using a first time slot in each of the first and second transceivers in combination so as to provide a united random access channel, whereby when a mobile station transmits an uplink radio frequency burst, access of the first base station by the mobile station is recognized if the uplink radio frequency burst is received by the first transceiver during the first transceiver's first time slot, and access of the first base station by the mobile station is recognized if the uplink radio frequency burst is received by the second transceiver during the second transceiver's first time slot, wherein a second time slot in one of the first and second frames of uplink time slots serves a dedicated channel used by a second mobile station, and further comprising means for handing over service of the second mobile station to a second base station, wherein the means for handing over service comprises:

means for using information about radio path delay between the second mobile station and the first base station to identify, in the second base station, a frame of uplink time slots having a timing offset that is predicted to be appropriate for receiving an uplink transmission from the second mobile station to the second base station; and means for selecting a second time slot in the identified frame of time slots and assigning the selected second time slot for use by the second mobile station after the handover.

19. The apparatus of claim 18, wherein the dedicated channel used by the second mobile station is a traffic channel for subscriber speech.

20. The apparatus of claim 18, wherein the dedicated channel used by the second mobile station is a signalling channel for control purposes.

21. The apparatus of claim 18, wherein the means for using information about radio path delay between the second mobile station and the first base station to identify, in the second base station, the frame of uplink time slots further comprises means for using information about relative locations between the first and second base stations to identify, in the second base station, the frame of uplink time slots having the timing offset that is predicted to be appropriate for receiving an uplink transmission from the second mobile station to the second base station.

22. The apparatus of claim 18, further comprising means for using information about radio path delay between the second mobile station and the first base station to initiate operation of the means for handing over service of the second mobile station to the second base station.

\* \* \* \* \*